Dec. 6, 1966   R. L. WEAVER ETAL   3,289,862
SILO UNLOADER
Filed Feb. 10, 1965   2 Sheets-Sheet 2
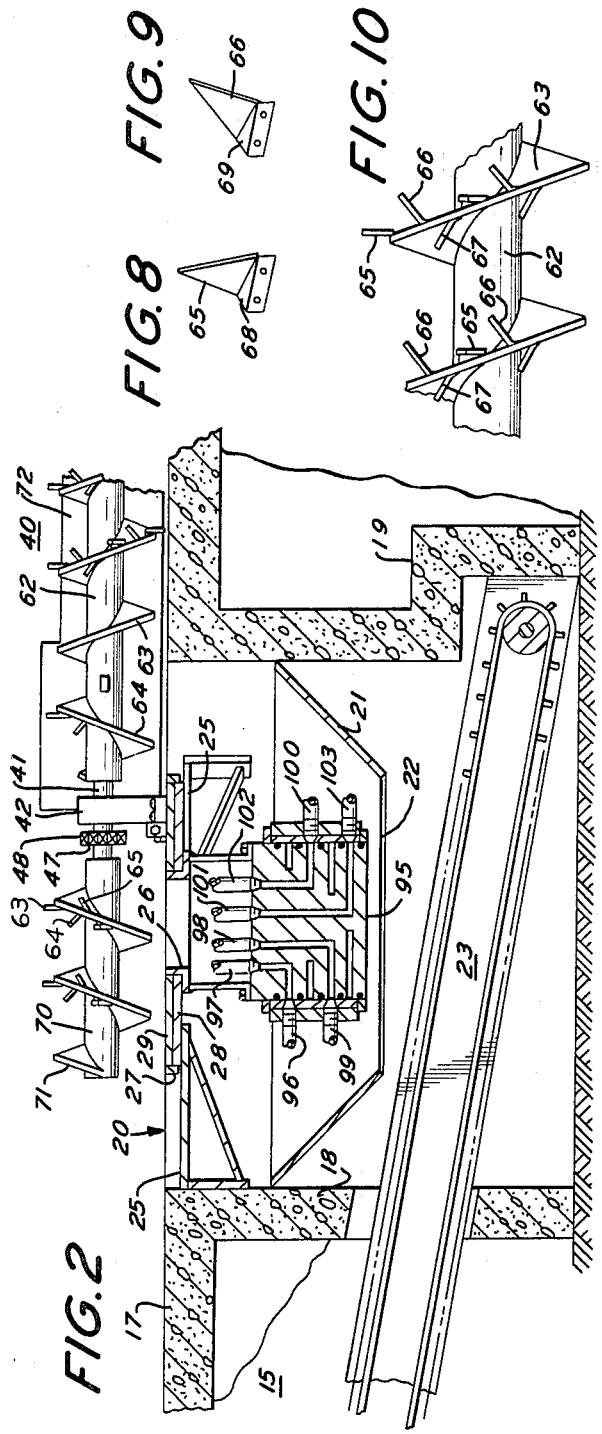
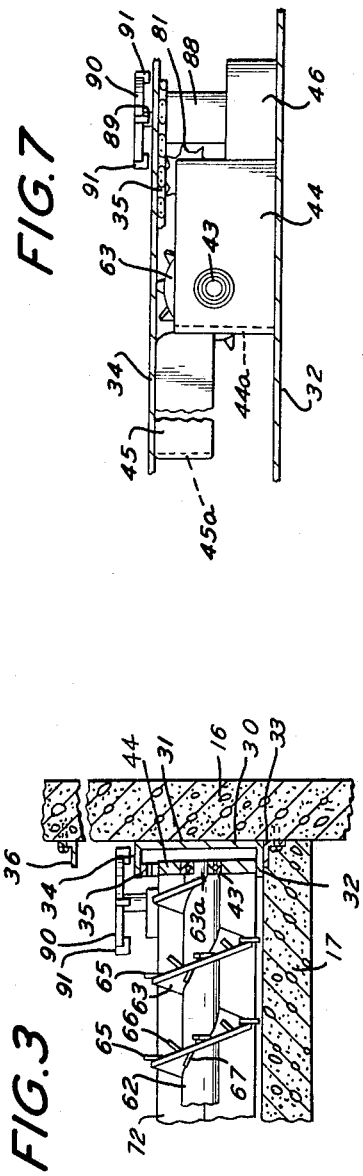
INVENTORS.
RICHARD L. WEAVER
BENJAMIN K. SMOKER
BY
ATTORNEY United States Patent Office 3,289,862
Patented Dec. 6, 1966

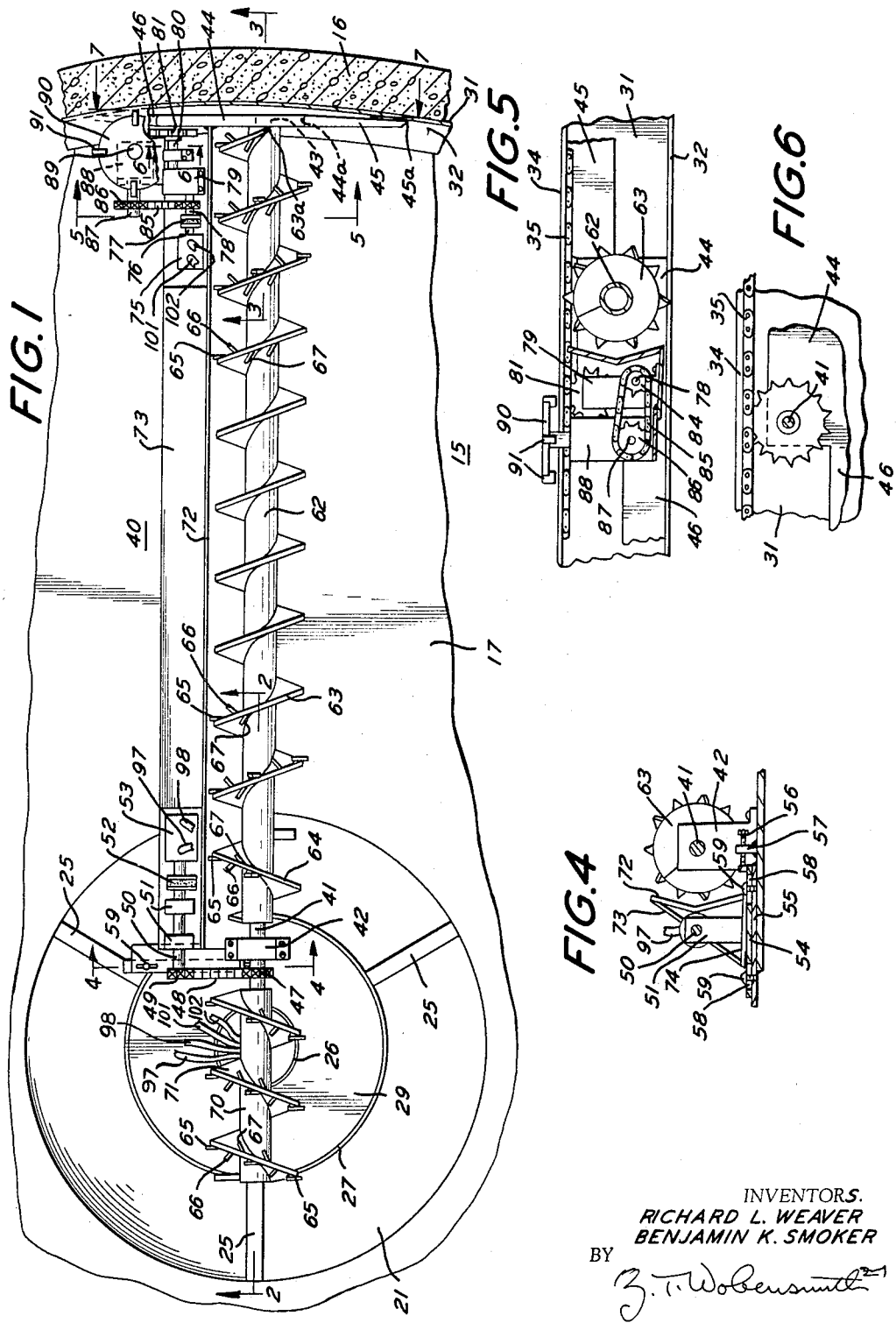

3,289,862
SILO UNLOADER
Richard L. Weaver, R.D. 5, Lebanon, Pa., and Benjamin K. Smoker, R.D. 3, Myerstown, Pa.
Filed Feb. 10 1965, Ser. No. 431,571
3 Claims. (Cl. 214—17)

This invention relates to apparatus for unloading silos, and more particularly to apparatus at the bottom of the silo for separating and delivering to the exterior of the silo, as desired, silage stored in the silo.

Difficulties have been encountered with apparatus heretofore available for bottom unloading of silos. In one form of unloader a hollow cylinder or ring of silage is left untouched and remains along the inner wall of the silo. With augers heretofore employed, also, there has been a tendency to leave a central pillar or core of silage. Augers heretofore available have been subject to severe use and frequently jam and are unable to cut out compacted silage particularly with some stored material and when the silo is fully loaded or nearly so.

It is the principal object of the present invention to provide a silo unloader with which complete unloading of the silo can be accompilished with a minimum of difficulty.

It is a further object of the present invention to provide a silo unloader which has an improved compound auger, for moving the silage both from the outer end and from the inner end to an intermediate location for removal.

It is a further object of the present invention to provide a silo unloader having an auger with improved mounting, guiding and driving mechanism for the auger.

It is a further object of the present invention to provide a silo unloader having an auger with improved cutting blades thereon.

It is a further object of the present invention to provide a silo unloader with auxiliary cutters impelled therewith including a cutter effective close to the silo wall.

It is a further object of the present invention to provide a silo unloader of the character aforesaid which may be easily installed in new silos, or which may be installed in silos now in use with a minimum of change or reconstruction.

Other objects and advantageous features of the invention will be apparent from the description and claims.

The nature and characteristic features of the invention will be more readily understood from the following description taken in connection with the accompanying drawings forming part thereof, in which;

FIGURE 1 is a top plan view of a silo unloader in accordance with the invention, part only of the silo being shown;

FIG. 2 is a fragmentary vertical sectional view taken approximately on the line 2—2 of FIG. 1;

FIG. 3 is a fragmentary vertical sectional view taken approximately on the line 3—3 of FIG. 1;

FIG. 4 is a fragmentary vertical sectional view taken approximately on the line 4—4 of FIG. 1;

FIG. 5 is a fragmentary vertical sectional view taken approximately on the line 5—5 of FIG. 1;

FIG. 6 is a fragmentary vertical sectional view taken approximately on the line 6—6 of FIG. 1;

FIG. 7 is a fragmentary vertical sectional view taken approximately on the line 7—7 of FIG. 1;

FIG. 8 is a view in perseptctive of one form of cutter blade employed on the auger shown in FIGS. 1 and 10;

FIG. 9 is a view in perspective of another form of cutter blade employed on the auger shown in FIGS. 1 and 10; and FIG. 10 is a view in elevation of a portion of the auger shown in FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, the lower part of a silo is shown at 15 having a vertical cylindrical wall 16. The silo 15 is preferably of the type which is closed or sealed to prevent the entrance of air.

The lower part of the silo 15 has a horizontal wall or floor 17 with a central generally cylindrical wall 18 extending downwardly therefrom with a lower offset 19.

Below the level of the floor 17 and disposed within and carried by the wall 18 a bridging section 20 is provided with a conical baffle or hopper 21 therebelow. The hopper 21 has a bottom opening 22 for delivery of its contents onto a conveyor 23. The conveyor 23 is preferably closed at its outer end (not shown) to prevent the free influx of air to the space within the wall 18 and therefrom to the interior of the silo 15.

The bridging section 20 includes radial supports 25 which carry inner and outer guide rings 26 and 27 with a supporting ring plate 28 therebetween for supporting and guiding an inner auger mounting ring 29.

The silo 15, along the bottom of the side wall 16 has a horizontal annularly disposed channel ring 30 mounted therealong with the web 31 disposed along the inner face of the silo wall 16, a lower flange 32 supported on an annularly disposed angle ring 33 which is flush with the floor 17.

The ring 30 also has an upper flange 34 with a conveyor chain 35 welded to the lower face thereof to provide a continuous rack for sprocket engagement.

The wall 16, in spaced relation above the ring 30, of the order of about two feet, has a ledge 36 formed of an angle, secured thereto to relieve the channel ring 30 of part of the load which would otherwise be imposed thereon by the silage thereabove.

An auger assembly 40 is provided which includes a main shaft 41 journaled in a bearing 42 secured to the auger mounting ring 29. The shaft 41 is also journaled in a bearing 43 carried in a vertical outer auger shaft guide and support plate 44 which has a beveled leading edge 44a to cut silage away from the web 31. The plate 44 has a forwardly horizontally extending positioning shoe 45 which engages with and is slidable along the upper face of the lower flange 32 and has a beveled leading edge 45a to cut silage away from the web 31 and a rearwardly horizontally extending positioning shoe 46 which engages with and is slidable along the lower face of the upper flange 34 between the rack chain 35 and the web 31.

The shaft 41 can be driven in any desired manner but is preferably provided with a sprocket 47 with which a driving chain 48 is in engagement. The chain 48 is engaged by a sprocket 49 on an auger drive shaft 50. The shaft 50 is carried in journal blocks 51 and is connected by a flexible coupling 52 to a hydraulic auger driving motor 53. The motor 53 and the blocks 51 are secured to an upper frame plate 54 which is positioned on a lower fixed frame plate 55 by a screw 56 engaged in an abutment block 57 on the mounting ring 29. The frame plate 54 has elongated slots 58 through which clamping bolts 59 are threaded into the lower frame plate 55.

The shaft 41, between the bearing 42 and the bearing 43, has an auger tube 62 secured thereto. The tube 62 has mounted thereon a major length helical cutter blade support 63 of one hand which extends to the plate 44 and preferably has a sharpened radial terminal edge 63a, and a minor length helical cutting blade support 64 of the opposite hand.

Cutter blades 65, 66 and 67 with different cutting characteristics are preferably employed on both the supports 63 and 64. As shown, the cutter blades 65 (see FIGS. 8 and 10) are mounted on mounting brackets 68 to extend radially outwardly in successive parallel planes normal to the longitudinal axis of the shaft 41. The cutter blades 66 (see FIGS. 9 and 10) are mounted on mounting brackets 69 and are inclined with respect to the supports 63 and 64 so as to overlap the lines of cutting of the blades 65. The cutter blades 66 are mounted on one side of the blade supports 63 and 64 while similar oppositely inclined cutter blades 67 of opposite hand are mounted on the supports 63 and 64.

The shaft 41, on the other side of the bearing 42, and extending to and beyond the outer guide ring 27 has an auger tube 70 with a helical cutter blade support 71 of the same hand as the blade support 64. The cutter blade support 71 is provided with cutter blades 65, 66 and 67.

An auger backing plate 72 of flattened U-shape with a back brace plate 73 and a bottom plate 74 extending from the upper frame plate 54 and sloped upwardly from its first edge to prevent silage wedging is secured at one end to the upper frame plate 54 and at the other end to the support plate 44. The journal blocks 51 and the motor 53 can be carried on the bottom plate 74.

In order to advance the auger assembly horizontally about its center of rotation the bottom plate 74 has a hydraulic motor 75 carried thereby which has a shaft 76 connected through a flexible coupling 77 to a shaft 78. The shaft 78 is connected through a speed reducing gear box 79 to a shaft 80. The shaft 80 has a driving sprocket 81 thereon which engages the rack chain 35. The shaft 80 also has secured thereto a sprocket 84 which is connected by a chain 85 to a sprocket 86 on a shaft 87. The shaft 87 is connected to a speed reducing gear box 88 with an output shaft 89. The shaft 89 has a horizontal cutter wheel 90 with teeth 91. The wheel 90 and its teeth 91 move above the upper flange 34 of the channel ring 30 to clear away the silage thereabove during advancing movements of the auger assembly.

The inner guide ring 27 has secured thereto a fluid coupling 95 for supply and return of pressure fluid. Fluid under pressure in a pipe 96 is delivered through the coupling 95 to a pipe 97 and thence to the motor 53. A return pipe 98 is connected through the coupling 95 to a return pipe 99.

Fluid under pressure in a supply pipe 100 is delivered through the coupling 95 to a pipe 101 and thence to the motor 75. A return pipe 102 is connected through the coupling 95 to a return pipe 103.

The supply of fluid to the pipes 96 and 100 can be controlled in any preferred manner, and reversed, if desired, for retraction to prevent jamming.

The mode of operation will now be pointed out.

Fluid under pressure supplied to motor 53 is effective through the coupling 52, the shaft 50, the sprocket 49, the chain 48 and the sprocket 47 for driving the shaft 41.

The shaft 41 is effective for rotating the auger tube 62 with its helical cutter blade supports 63 and 64. Rotation of the blade supports 63 and 64 causes the blades 65, 66 and 67 to be advanced successively and continuously into contact with the silage to cut the silage and move it for delivery to the hopper 21.

It will be noted that the cutter blades 65 cut in parallel vertical paths while the cutter blades 66 and 67 cut in conical paths.

The blade support 64 tends to advance the cut silage toward the right as seen in FIG. 1 while blade support 63 advances the cut silage toward the left.

Rotation of the shaft 41 is also simultaneously effective for rotating the auger tube 70 and the blade support 71 thereon. The cutter blades 65, 66 and 67 on the blade support 71 cut and move silage at the center of the silo 15 and prevent the occurrence of any central uncut pillar of silage.

The outer end of the auger shaft 41 is guided and retained in position by the support plate 44 and its shoes 45 and 46.

It is of course necessary that the auger assembly 40 be swung around to advance the cutter blades 65, 66 and 67 to locations for cutting.

Fluid under pressure supplied to the motor 75 to rotate the shaft 76 is effective through the flexible coupling to rotate the shaft 78. The sprocket 81 on the shaft 80, driven from the shaft 78 through the gear box 79, by its engagement with the rack chain 35 advances the open face of the auger assembly 40 for cutting and silage removal.

Upon rotation of the shaft 78, also, the sprocket 84, through the chain 85, sprocket 86, shaft 87, gear box 88 and shafts 89 drives the cutter wheel 90. The teeth 91 of the cutter wheel 90 are effective for cutting and impelling silage along the wall 16 and above the upper flange 34 for removal thereof. The ledge 36 reduces the load upon the cutter wheel 90 and teeth 91.

It will be noted that structure has been provided for effectively carrying out the objects of the invention.

We claim:

1. A silo unloader for a silo having an upright wall and a bottom floor with an opening comprising, for bottom unloading of the silo, an auger means including an inner portion extending across said opening in a substantially unobstructed flow path of the silage thereabove and an outer portion extending toward said wall, rotating means for rotating said auger means about its own axis, advancing means for advancing said auger means in a path around said bottom floor to feed silage to said opening, said inner portion of said auger means being moved by said advancing means over said opening in a path which substantially completely encompasses the entire opening while maintaining the inner portion in a substantially unobstructed flow path of the silage thereabove to enable the movement of the silage by said inner portion into said opening, said inner portion extending across said opening at least beyond the vertical axis about which the auger means is advanced to insure the removal of silage.

2. A silo unloader as defined in claim 1 and wherein said inner portion and said outer portion include auger helical members arranged to move silage to their point of juncture.

3. A silo unloader as defined in claim 1 and wherein said inner portion extends diametrically across said opening.

References Cited by the Examiner

UNITED STATES PATENTS

| 2,617,351 | 11/1952 | Graham et al. | 214—17 X |
| 3,050,201 | 8/1962 | Humphrey | 214—17 |
| 3,050,294 | 8/1962 | Patz et al. | 214—17 |
| 3,055,649 | 9/1962 | Dretzke et al. | 214—17 |
| 3,121,501 | 2/1964 | Laidig | 214—17 |

GERALD M. FORLENZA, Primary Examiner.

ROBERT G. SHERIDAN, Examiner.